United States Patent Office 3,134,385
Patented May 26, 1964

3,134,385
ARTICLE WASHING AND DRYING MACHINE HAVING REVERSING SINGLE-PHASE INDUCTION MOTOR
Donald S. Cushing, Louisville, Ky., assignor to General Electric Company, a corporation of New York
Filed Jan. 16, 1961, Ser. No. 82,854
1 Claim. (Cl. 134—58)

This invention relates to an electric control arrangement for use in the reversal of single-phase induction-type motors.

It is an object of my invention to provide a system in which a single-pole double-throw switch may be used to effect the reversal of a single-phase induction-type motor.

A more specific object of my invention is to achieve reversing control of a single-phase induction motor of the type having a main winding and an auxiliary winding wherein the reversal of a single-pole double-throw switch from one position to the other reverses the phase relationship of the windings.

Briefly stated, in accordance with one aspect of my invention, I provide a motor which is intended to be for use in combination with the conventional domestic type of single-phase source of power. With this type of power source, there are included first and second conductors with a predetermined voltage drop across them, and a third conductor which has a part of the predetermined voltage drop with the first conductor and the remainder of the voltage drop with the second conductor. The motor has first and second windings which, in the conventional manner of single-phase induction-type motors, are displaced in space and phase from each other so as to make the motor self starting when the windings are connected in parallel. In series with the first winding there is a single-pole double-throw switch which connects the first winding across the first and third conductors in one position and across the second and third conductors in the other position. By causing the switch to provide this relationship for the first winding, and by connecting the second winding between any specified two of the conductors, the closure of the switch from one position to the other reverses the direction of rotation of the motor by reversing the relationship of the two windings to each other.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

Figure 1:
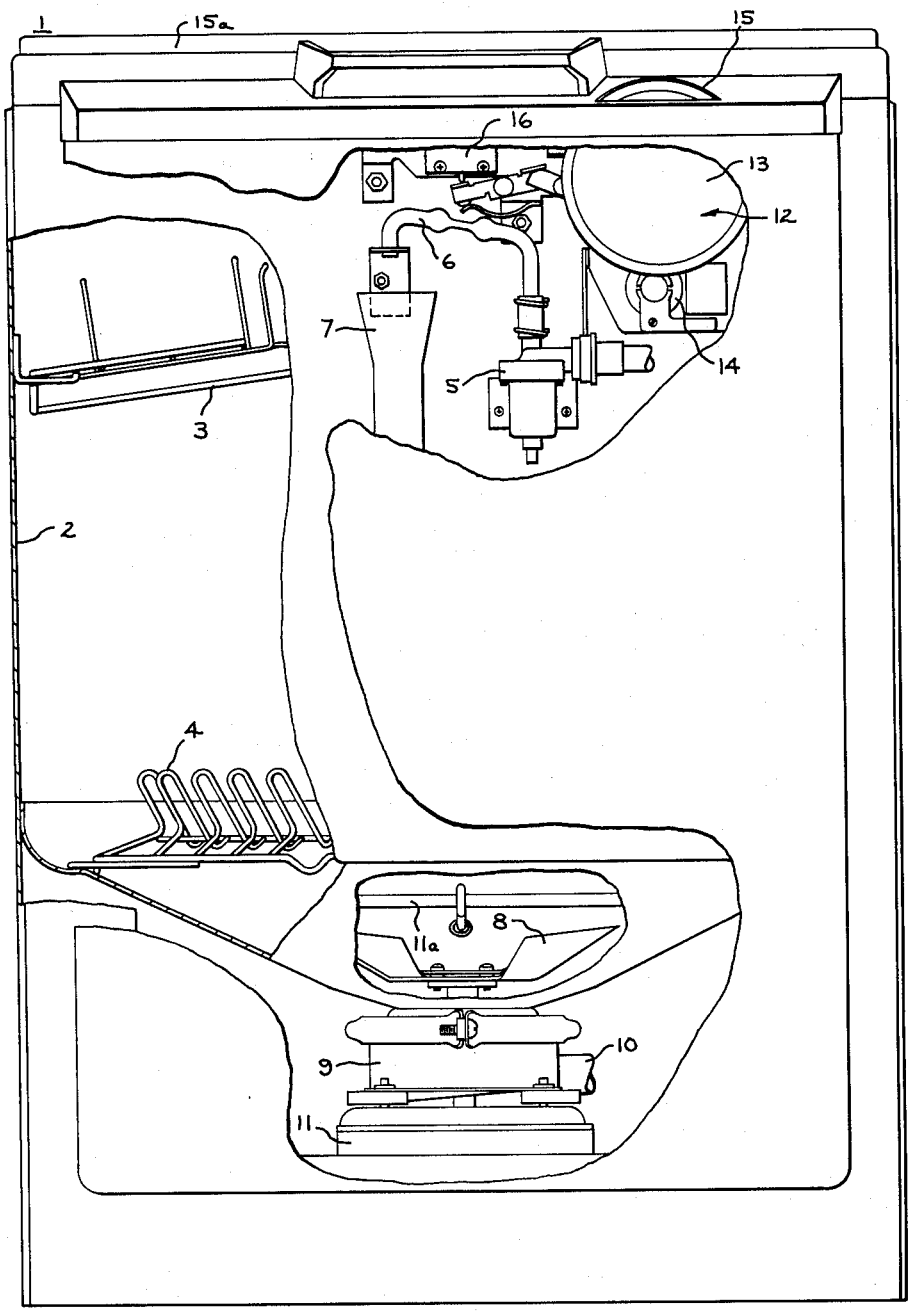
Figure 2:
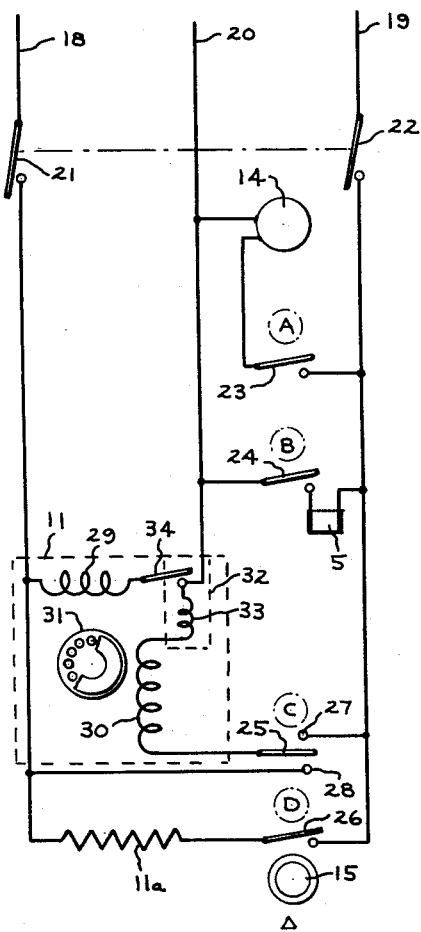
Figure 3:
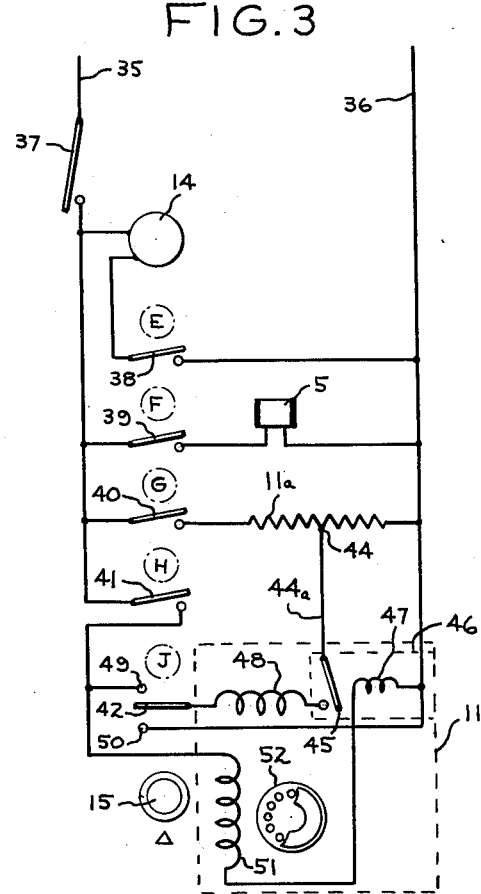

In the drawings, FIGURE 1 is a front elevational view, with some of the parts broken away, of an automatic dishwasher typifying the type of machine which may advantageously incorporate my invention;

FIGURE 2 is a schematic and simplified illustration of a control circuit appropriate for use in the dishwasher of FIGURE 1, which circuit incorporates my improved motor reversing arrangement; and FIGURE 3 is a simplified schematic illustration of another circuit arrangement for the machine of FIGURE 1 which includes a second embodiment of my improved motor reversing arrangement.

Referring now to FIGURE 1, there is shown a dishwasher 1 having an enclosed washing compartment or tub 2 of generally rectangular configuration in which are mounted an upper rack 3 and a lower rack 4 arranged to support dishes or the like during washing operations. Dishwasher 1 is provided with a water inlet valve 5 adapted to be connected to a water supply system, a water inlet conduit 6, and a fill funnel 7 communicating with the interior of tub 2. Located at the bottom of tub 2 and arranged to circulate washing fluid through the washing compartment is a rotary impeller 8. A drain pump 9 having an inlet communicating with tub 2 and an outlet connected to drain conduit 10 is supported beneath the tub, the housing of pump 9 being arranged to support an electric motor 11 which drives the impeller 8 so as to circulate the fluid in the tub when rotating in one direction and to operate pump 9 so as to discharge fluid through conduit 10 when driven in the other direction. The washing impeller and drain pump arrangement is the invention of Russell M. Sasnett and Lauren W. Guth, and is more fully described in Patent 2,959,179 issued to them on November 8, 1960 and assigned to the assignee of the present application. An electric heating unit 11a, suitably sheathed for immersion in water, is provided below rack 4 so as to effect evaporation of moisture from the dishes after they have been washed.

Automatic operation of dishwasher 1 to provide a complete dishwashing and drying cycle is effected by a sequence control assembly generally indicated by the numeral 12. The sequence control assembly is arranged, as will be further explained, to control the operation of valve 5 and the energization of motor 11 and heater 11a. The sequence control assembly is also conventionally used to control the actuation at various times of other components of dishwashing machines such as rinse agent dispensers, detergent dispensers, and the like which do not form a part of the present invention and which are therefore not shown and not further mentioned in this application. In the conventional manner, the timer 12 may include a switch actuating cam assembly 13 which is arranged to be driven by a constant speed motor 14, such devices being well known in the art. In addition the position of the cam assembly may be manually set by use of a dial member 15 which is positioned so as to be conveniently accessible for manual operation.

The tub 2 has a top access opening which is closed by a hinged top cover 15a during washing operations, being held in closed position by a latch mechanism 16 of any suitable type such as, for instance, the mechanism disclosed and claimed in Patent 2,896,641 issued on July 28, 1959 to Melvin R. Kauffman and John A. Dicken, Jr., and assigned to the assignee of the present application.

Purely for purposes of ilustration, it will be understood that the typical full operating cycle of the dishwasher 1 may include a suitable number of rinsing, washing and drying steps; for instance, the cycle may include a preliminary rinse in which the inlet valve 5 is opened and the impeller 8 is rotated by the motor 11 for a short period of time, on the order of two minutes for instance, to circulate water in the tub; then motor 11 is reversed so as to operate the drain pump 9 and discharge the first charge of washing fluid from the tub, and the inlet valve 5 is shut. This may be followed by a second preliminary rinse on the same order as described immediately above, and then by a washing step also similar to the first preliminary rinse except that the introduction of water and the circulation thereof by impeller 8 continue for a longer period of time. There then follow one, or several, rinse steps similar to the preliminary rinse described; finally, a drying step of predetermined length, in which heater 11a is energized to cause evaporation of moisture from the dishes, may take place.

Referring now to FIGURE 2, there is shown a schematic and simplified control circuit which may be used to provide the above mentioned conrtol in machine 1 and which incorporates the improved motor reversing arrangement of my invention, it being understood that reversal of the motor 11 is required for the alternative functions of dishwashing and liquid removal. The electric components of dishwasher 1 are connected to a suitable source of power by a conventional three wire system wherein the machine is connected across the source of power by first and second conductors 18 and 19 so that the full voltage drop of the power source is provided across them. A third conductor 20 is provided and is connected to the power source so that part of the total voltage drop appears between the conductors 18 and 20 and the remainder of the drop appears between the conductors 19 and 20. Conventionally, most homes being built at present are furnished with such a supply system, the voltage across conductors 18 and 19 generally being on the order of 230 volts and the voltage between conductor 20, commonly called the neutral, and each of the other two conductors being on the order of 115 volts or half of the total voltage drop.

Switches 21 and 22 may be arranged in conductors 18 and 19 respectively; the two switches are ganged together and both form a part of lid switch 16 so that they are closed only when the lid is closed and at all other times are open. Connected between the conductors 19 and 20 is timer motor 14 which, as schematically indicated, controls the four cams A, B, C, and D which in this case make up the cam bank 13; the four cams respectively control switches 23, 24, 25, and 26. As stated the cams may also be manually rotated by the dial member 15. When, by manual rotation of dial member 15, the cams are rotated to a cycle starting position, the switch 23 is closed, and this provides for energization of the timer motor 14 across 115 volts through its connection between conductors 19 and 20.

With the timer motor thus energized, the cams are rotated to open and close their respective switches to provide the above-described sequence until the end of a cycle at which time all the switches 23 through 26 are opened to terminate the cycle. During the rotation of the cams, cam B controls the switch 24 and this, being in series with the solenoid valve 5 between conductors 19 and 20, controls the energization of the solenoid valve 5 across 115 volts. The switch 26, being in series with heater 11a across conductors 18 and 19, controls the energization of the heater across 230 volts.

The single-pole double-throw switch 25 is provided to control motor 11. Switch 25 has three positions, an open position in which it is shown, an upper position in which it engages a contact 27, and a lower position in which it engages a contact 28. Contact 27 is connected to conductor 19, and contact 28 is connected to condutor 18.

The motor 11 is of the conventional single-phase induction type wherein there are included in parallel a start winding 29 and a main winding 30. It will be understood that, in the conventional manner, these windings are provided on a magnetic core positioned around a conventional squirrel cage rotor 31. The windings 29 and 30 are displaced in space and phase from each other so that when they are energized in parallel a starting torque is created which causes the rotor 31 to start rotating. In the particular induction motor 11 illustrated, there is included a relay 32 wherein a coil 33 in series with the main winding 30 controls a switch 34 in series with the start winding 29. Upon a relative high level of current passing through the coil 33 it causes the switch 34 to close thereby completing the connection of winding 29 across conductors 18 and 20. This level of current is reached only when the motor is energized but rotor 31 is stationary or rotating substantially below running speed. At all other times, such as during normal motor operation, the switch 34 is open so as to remove winding 29 from the circuit.

It will be seen that the switch 25 is in series with one of the windings of the motor 11, more particularly, in the present case, the main winding 30. When the switch 25 is in its down position in engagement with contact 28, winding 30 is connected across conductors 18 and 20 in a directly parallel relationship with the winding 29. This causes the motor to rotate in a first predetermined direction which, for purposes of illustration, will be assumed to be the direction of rotation appropriate to cause operation of the impeller 8 of FIGURE 1.

When reverse rotation is desired, switch 25 is moved to its intermediate open position to allow rotor 31 to slow down (so that the relay will sense locked-rotor current conditions upon reclosing of switch 25), and then up into engagement with contact 27, across conductors 19 and 20 rather than conductors 18 and 20. It will be understood that, in a three wire single-phase circuit of the type described, the connection of one winding across conductors 19 and 20 provides, in effect, the opposite instantaneous polarity relationship to the other winding from that provided when it is connected across conductors 18 and 20. Thus, when winding 30 is connected across conductors 19 and 20, it has the opposite relationship to winding 29 from that which it had when it was connected across windings 18 and 20. As a result, with winding 29 remaining connected across the conductors 18 and 20, changing the switch 25 from one of its positions to the other will reverse the relationship of the windings and will cause the motor to rotate in the opposite direction to that which it previously had.

In the present case, it will be understood that the switch 25 may be caused to remain briefly by cam C in its intermediate position whenever a reversal is desired so as to permit the rotor 31 to slow down sufficiently to cause the relay contact 34 to be closed when the switch 25 is closed again. The motor 11 is reversed by switch 25 under the control of cam C so as to carry out the necessary washing and draining functions during a cycle, switch 25 being moved to open position at the end of the cycle.

It will be seen that my invention provides a single-pole double-throw switch 25 which is made effective, by proper relationship with the three conductors 18, 19, and 20, to cause reversal of the direction of rotation of the motor 11. The use of a three wire system such as that shown in FIGURE 2 is highly advantageous in that it provides a very substantial shortening of the drying time needed for dishes by virtue of the much greater power input to the heater 11a. Thus, in machines wherein the three wire system is already provided for some purpose, such as increased effectiveness of heater 11a, my reversing system may be provided without any additional expense.

It is to be recognized that dishwashing machines of the type shown in FIGURE 1 are conventionally, at the present time, on 115 volts for the sake of economy, despite the longer time required for the drying operation. Accordingly, there is shown in FIGURE 3 a second embodiment of my invention incorporated in a control circuit for a dishwasher which is to be operated entirely across a two wire 115 volt source of power rather than the three wire 230 volt source of power of FIGURE 2. Parts identical to those of FIGURE 2 are denoted by the same numerals.

In the embodiment of FIGURE 3, the electrical components of the dashwasher are connected across a pair of conductors 35 and 36 which have a 115 volt drop between them. Included in conductor 35 is a lid switch 37 which is controlled so as to be opened whenever the lid is opened and closed when the lid is closed. As before, the timer motor 14 is connected across 115 volts. In this case the timer motor 14 controls five cams E, F, G, H, and J, the cams in turn respectively controlling timer switches 38, 39, 40, 41 and 42. The cams E through J may be manually set by dial 15 in the same manner as before.

When the dial is moved to starting position, it causes cam E to close switch 38 which then completes the energizing circuit for timer motor 14 to toll a sequence, causing the cams to open and close the switches as necessary. The solenoid valve 5 has its energization controlled in the same manner as before by switch 39. A heater resistance element 11a is also connected across conductors 35 and 36 and has its energization controlled by a switch 40 operated by cam G; when switch 40 is closed and switch 41 is open, the heater is energized to provide a drying operation.

A tap 44 is provided at approximately the midpoint of heater 11a; tap 44 is connected, through conductor 44a, to the contact 45 of relay 46 which includes relay coil 47, and then to the start winding 48 of motor 11. The start winding may be connected by timer switch 42 either to a contact 49 or a contact 50. Contacts 49 and 50 are respectively connected to conductors 35 and 36. The relay coil 47 is in series with the main winding 51 of the motor, it being understood that the relationships of the windings, the relay, and the rotor 52 are the same as those described in connection with the corresponding parts of FIGURE 2.

In the embodiment of FIGURE 3, the resistance heating element, which may be provided with a resistance of about 20 ohms, acts as a voltage divider so that the conductor 44a which connects tap 44 to the contact 45 is, in effect, a third conductor positioned voltage-wise between conductors 35 and 36. With this in mind, it can be seen that, when switches 40 and 41 are closed, engagement of switch 42 with contact 49 energizes start winding 48 (which has a much lower resistance than the heater) between conductors 35 and 44a, and engagement of switch 42 with conductor 50 energizes the start winding 48 between conductors 44a and 36. In this manner two opposite relationships may be obtained for the start winding 48 with respect to the main winding 51 which is always, as shown, preferably connected across the two conductors 35 and 36 so as to receive the full 115 volt potential.

Basically the same control arrangement is provided as previously in that the relationship of one of the two windings of the motor is reversed relative to the other by means of a simple single-pole double-throw switch, in this case switch 42. When the motor is to rotate in one direction, switch 42 engages contact 49. When this occurs, the winding 48 is energized through a circuit which proceeds from conductor 35 through switches 41 and 42, through the start winding itself, then through the relay contact 45 and the conductor 44a to the tap 44; at this point, the circuit is then completed to the conductor 36 through part of heater 11a. When the switch 42 engages contact 50, the start winding circuit is completed, starting with conductor 35, through the switch 40, part of heater 11a, and tap 44, then through conductor 44a, relay contact 45, the start winding 48, switch 42 and conductor 36. It will readily be seen that the connection of winding 48 relative to winding 51 is thus reversed and, assuming proper connection of winding 48 through switch 45, the reversed closing of the switch 42 will cause both windings to be connected for energization and cause the motor to start up.

It can thus be seen that my invention may appropriately be made use of in a two-wire system as well as in a three-wire system, provided an appropriate resistance device such as the heater is present, so that it may perform the added function of the voltage divider in the circuit as well as its own heating function.

It will be seen from the foregoing that my invention provides an article washing and drying machine, such as a dishwasher, having an improved motor reversing system wherein a single-pole double-throw switch effects the necessary reversal of the relationship of the two windings of a single-phase induction motor which is needed in order to reverse the motor. It will be understood that, while the more commonly used type of motor in which one of the windings is disconnected during running of the motor has been shown, my invention may also be used in those motors wherein the second winding (then called an auxiliary winding rather than a start winding) is retained in the circuit during operation of the motor. Also, of course, in those motors which do disconnect one of the windings during operation, mechanical means such as centrifugal switches may be used for the disconnection as well as the relay shown.

It will thus be understood that while, in accordance with the patent statutes, I have described what at present are considered to be the preferred embodiments of my invention, it will be obvious to those skilled in the art that various changes and modifications may be made therein without departing from the invention, and I therefore aim in the appended claim to cover all such changes and modifications as fall within the true spirit and scope of my invention.

What I claim as new and desire to secure by Letters Patent of the United States is:

For use in combination with a single-phase source of power including first and second conductors having a predetermined voltage drop across them, an article washing and drying machine comprising:

(a) an article container,
(b) means for washing said articles in said container,
(c) means for draining washing liquid from said container,
(d) electrical resistance-type heating means positioned to heat articles in said container and thereby dry them by evaporation of moisture therefrom,
(e) said heater being connected across said first and second conductors,
(f) a third conductor tapped into said heating means intermediate its ends,
(g) a single-phase induction-type electric motor connected in driving relation to said washing means and said draining means,
(h) said motor operating said washing means in one direction of rotation and operating said draining means in the other direction of rotation,
(i) said motor including first and second windings displaced in space and phase from each other,
(j) a single-pole double-throw switch in series with said first winding,
(k) said switch in its first operative position connecting said first winding across said first and third conductors,
(l) said switch in its second operative position connecting said first winding across said second and third conductors,
(m) said second winding being connected between said first and second conductors whereby movement of said switch from one position to the other reverses the direction of rotation of said motor.

References Cited in the file of this patent
UNITED STATES PATENTS

| | | |
|---|---|---|
| 1,954,657 | Welch | Apr. 10, 1934 |
| 2,428,784 | Cole | Oct. 14, 1947 |
| 2,990,835 | Cushing | July 4, 1961 |
| 3,070,714 | Jacobs | Dec. 25, 1962 |